(12) United States Patent
Redman et al.

(10) Patent No.: US 8,736,618 B2
(45) Date of Patent: May 27, 2014

(54) SYSTEMS AND METHODS FOR HOT PLUG GPU POWER CONTROL

(75) Inventors: David J. Redman, Fremont, CA (US); Wai Yu Trevor Tsang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 335 days.

(21) Appl. No.: 12/770,431

(22) Filed: Apr. 29, 2010

(65) Prior Publication Data
US 2011/0267359 A1  Nov. 3, 2011

(51) Int. Cl.
*G06F 3/038* (2013.01)
(52) U.S. Cl.
USPC .......................... 345/502; 345/504
(58) Field of Classification Search
USPC .................................. 345/501–503
See application file for complete search history.

(56) References Cited

U.S. PATENT DOCUMENTS

| | | | |
|---|---|---|---|
| 5,649,001 A * | 7/1997 | Thomas et al. ............ | 379/93.07 |
| 7,663,633 B1 * | 2/2010 | Diamond et al. ............ | 345/503 |
| 7,663,635 B2 * | 2/2010 | Rogers et al. ............... | 345/568 |
| 7,746,081 B2 * | 6/2010 | Slaton ........................... | 324/539 |
| 2005/0162336 A1 * | 7/2005 | McClintock et al. ......... | 345/1.1 |
| 2006/0119603 A1 * | 6/2006 | Chen et al. ................... | 345/502 |
| 2007/0103477 A1 * | 5/2007 | Paquette et al. ............. | 345/545 |
| 2008/0034238 A1 * | 2/2008 | Hendry et al. ............... | 713/323 |
| 2008/0117222 A1 * | 5/2008 | Leroy et al. ................. | 345/522 |
| 2009/0027401 A1 * | 1/2009 | Loveridge et al. ............ | 345/501 |
| 2009/0079746 A1 * | 3/2009 | Howard et al. ............... | 345/502 |
| 2009/0083825 A1 * | 3/2009 | Miller et al. ................. | 725/151 |
| 2009/0157914 A1 * | 6/2009 | Hunkins et al. ............... | 710/30 |
| 2009/0160733 A1 * | 6/2009 | Chiba ........................... | 345/1.3 |
| 2010/0079444 A1 * | 4/2010 | Kyriazis et al. .............. | 345/418 |
| 2011/0001750 A1 * | 1/2011 | Kim et al. .................... | 345/419 |
| 2011/0216245 A1 * | 9/2011 | Kyriazis et al. .............. | 348/723 |

OTHER PUBLICATIONS

[online], "Understanding EDID—Extended Display Identification Data", [retrieved Oct. 5, 2012], URL: http://www.extron.com/download/files/whitepaper/understanding_edid.pdf, Jun. 6, 2009.*
[online], "HDMI 1.4 Specification", [retrieved Sep. 18, 2012], URL: http://www.hdmi.org/download/press_kit/PressBriefing_HDMI_4_FINAL_8_0_061809.pdf, 2009.*
[online], [retrieved Feb. 11, 2013], "STDP3110 DisplayPort to VGA Converter", URL: http://www.forsun-tech.com/asp_bin/UploadFile/201067103226139.pdf, Oct 2009.*
Matthew Garrett, "Powering Down," Ace Queue, Nov./Dec. 2007, pp. 16-21.
International Search Report and Written Opinion for PCT Application No. PCT/US/2011/034288 dated Jul. 20, 2011, 12 pgs.

* cited by examiner

*Primary Examiner* — Ulka Chauhan
*Assistant Examiner* — Patrick F Valdez
(74) *Attorney, Agent, or Firm* — Fletcher Yoder PC

(57) ABSTRACT

Systems and methods include an electronic device having multiple GPUs and a GPU power control process that controls switching between a first GPU and a second GPU, such as a high performance GPU. The electronic device may be coupled to an external display by a passive adapter or an active adapter. The GPU power control process may determine if the second GPU is active and switch to the second GPU upon connection of the external display through either the passive adapter or the active adapter. Upon connection of an active adapter, the GPU power control process may use hot plug functionality to determine connection of the external display to the active adapter and provide appropriate switching in response thereto.

24 Claims, 9 Drawing Sheets

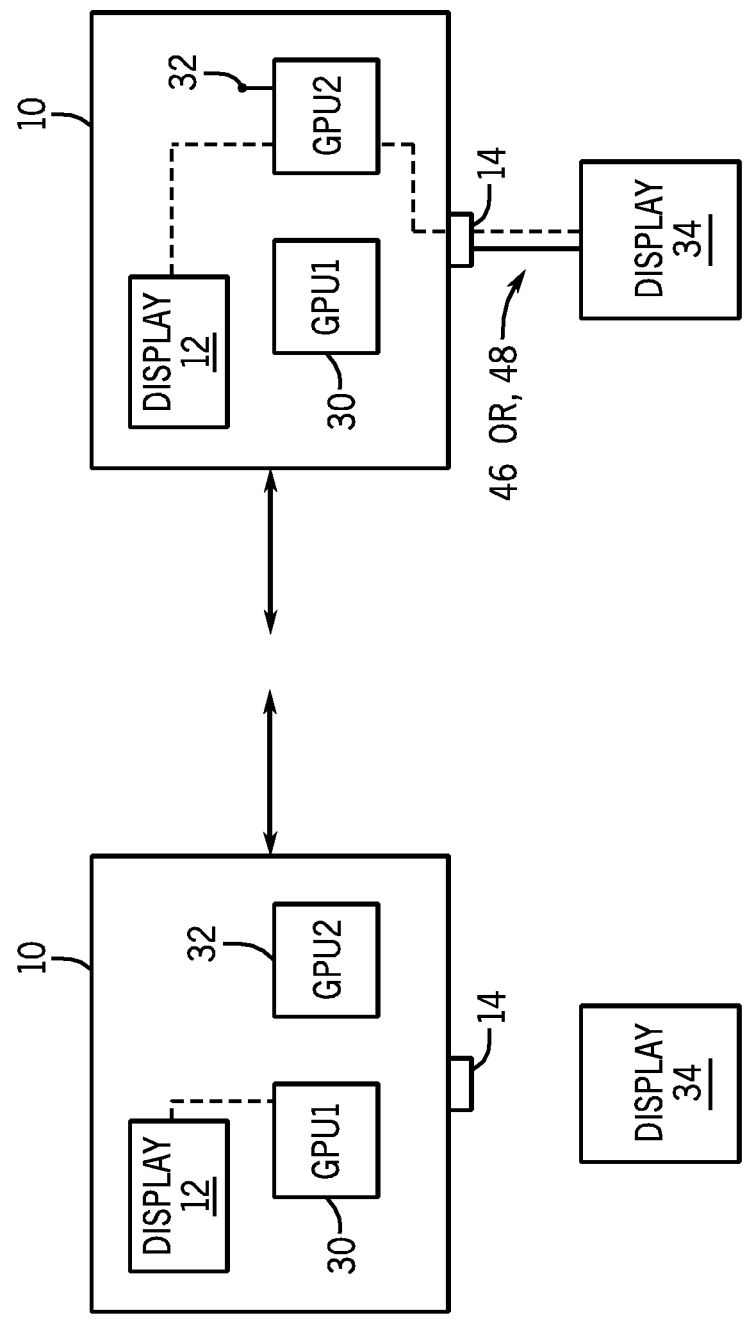

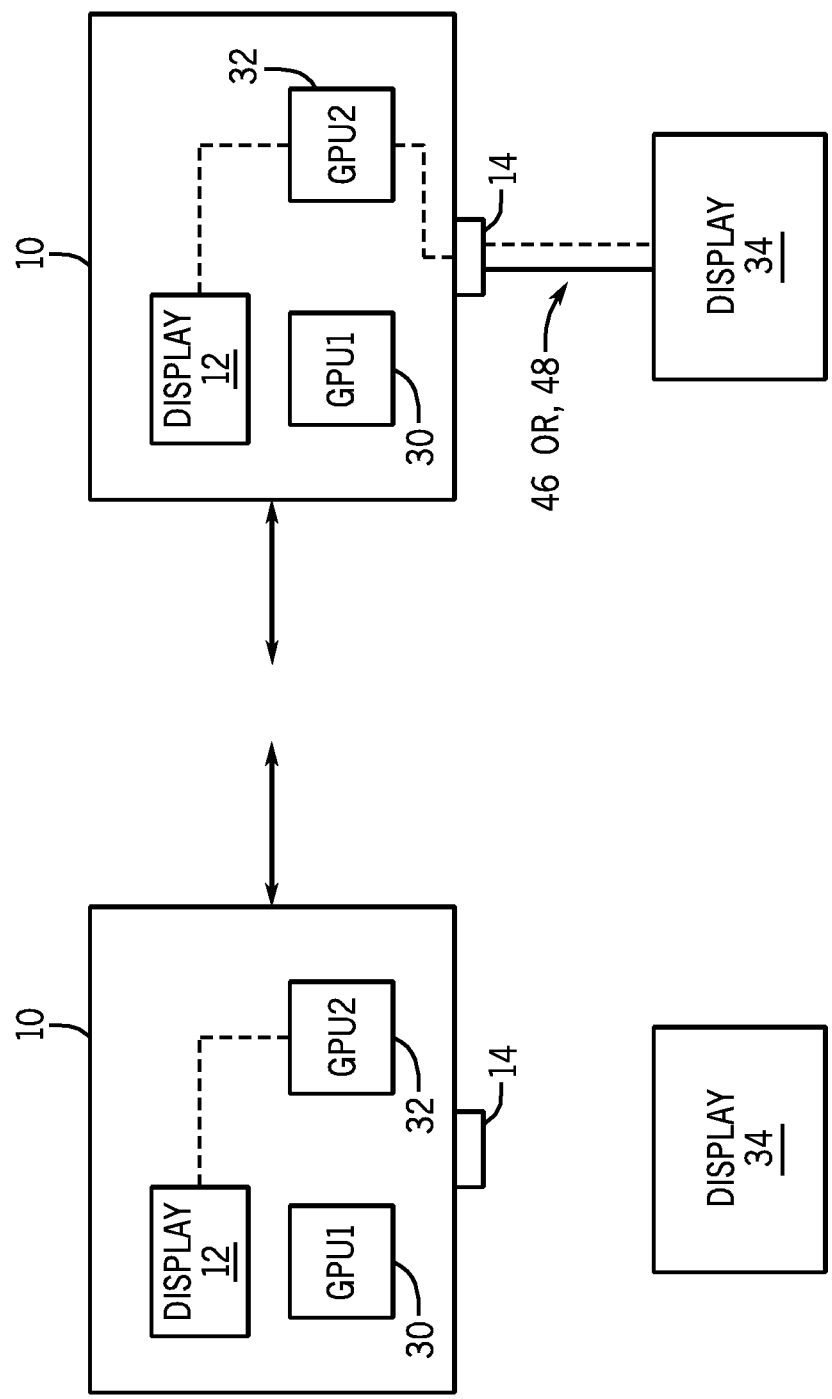

SYSTEMS AND METHODS FOR HOT PLUG GPU POWER CONTROL

BACKGROUND

The present disclosure relates generally to graphics processing and, more specifically, to management of multiple graphics processors.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, including computers and portable devices such as phones and media players, typically include display screens to display user interfaces, applications, video playback, video games, etc. A display of an electronic device may be driven by a specialized processor, referred to as a graphics processing unit (GPU). The GPU may drive an internal display of the electronic device. Additionally, or alternatively, a GPU of such devices may drive an external display connected to the electronic device.

Some electronic devices may include multiple GPUs, such as a dual GPU device, in which one or the other GPU is used to drive a display. However, in such devices, a user may have to power cycle the device to switch GPU resources for applications from one GPU to the other GPU, and the switching may require manual operation from the user. This action may be disruptive for the user and may discourage use of the GPU resource switching capability. Further, the GPUs may have different capabilities, and a user may not switch to the appropriate GPU for the appropriate display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A system and method are provided that include a GPU power control process that facilitates switching between a first GPU and a second GPU based on connection of an external display through an adapter. An electronic device may include a first GPU and a second GPU and tangible computer-readable storage media defining instructions to detect connection of an external display through an adapter, determine if the first GPU is active, and switch to the first GPU to provide output to the external display if the first GPU is not active. The GPU power control process may detect connection of an adapter to the electronic device and read an indication of connection of an external display through the adapter. One of the GPUs of the electronic device may be activated based on the indication.

BRIEF DESCRIPTION OF THE DRAWINGS

Various aspects of this disclosure may be better understood upon reading the following detailed description and upon reference to the drawings in which:

FIGS. 4 and 5 are block diagrams of a GPU power control process in accordance with an embodiment of the present invention;

FIGS. 6 and 7 are block diagrams of a GPU power control process in accordance with another embodiment of the present invention;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the invention may include an electronic device having multiple GPUs and a GPU power control process that controls switching between a first GPU and a second GPU, such as a high performance GPU. The electronic device may be coupled to an external display by a passive adapter or an active adapter. The GPU power control process may determine if the second GPU is active and switch to the second GPU upon connection of the external display through either the passive adapter or the active adapter. Upon connection of an active adapter, the GPU power control process may use hot plug functionality to determine connection of the external display to the active adapter and provide appropriate switching in response thereto.

Figure 1:
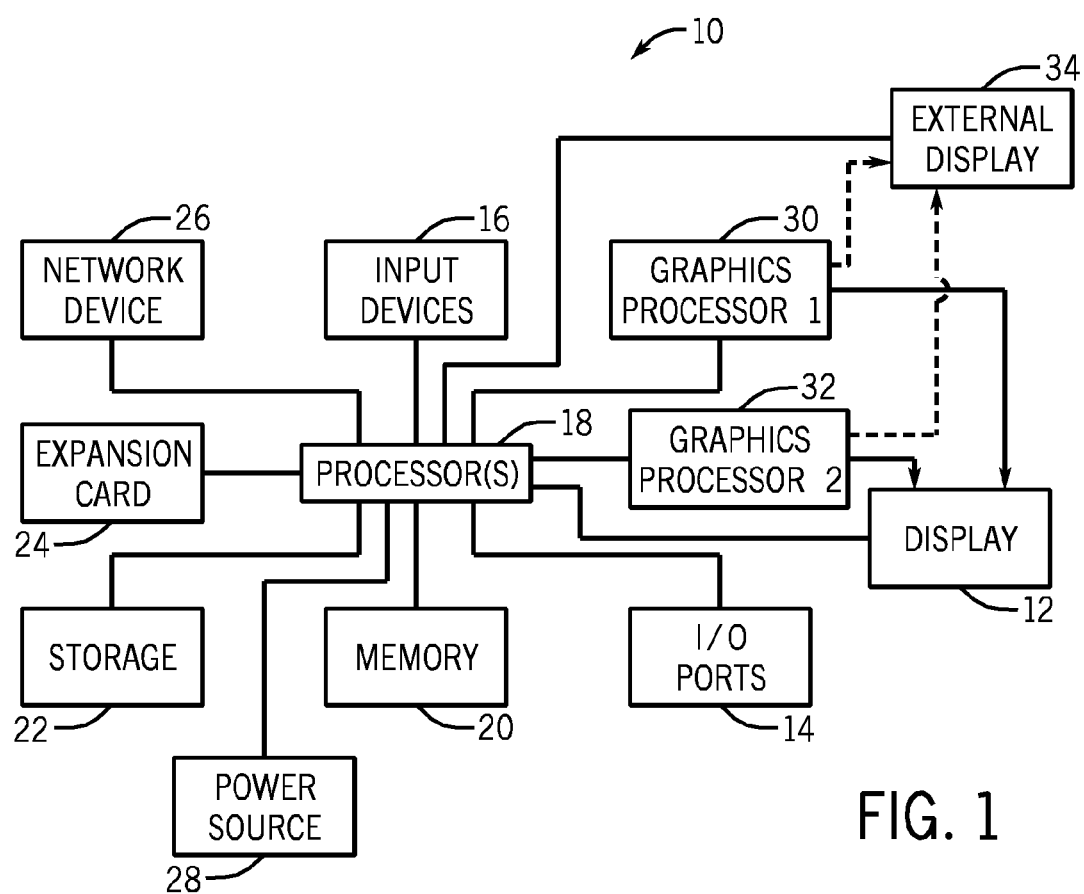
FIG. 1 is a block diagram of exemplary components of an electronic device, in accordance with an embodiment of the present invention.

An example of a suitable electronic device mentioned above may include various internal and/or external components which contribute to the function of the device. FIG. 1 is a block diagram illustrating the components that may be present in such an electronic device 10 and which may allow device 10 to function in accordance with the techniques discussed herein. Those of ordinary skill in the art will appreciate that the various functional blocks shown in FIG. 1 may include hardware elements (including circuitry), software elements (including computer code stored on computer-readable media) or a combination of both hardware and software elements. It should be further noted that FIG. 1 is merely one example of a particular implementation and is merely intended to illustrate the types of components that may be present in a device 10. For example, in the presently illustrated embodiment, these components may include an internal display 12, I/O ports 14, input devices 16, one or more processors 18, memory device 20, non-volatile storage 22, expansion card(s) 24, networking device 26, power source 28, first graphics processing unit (GPU1) 30 and second graphics processing unit (GPU2) 32. In some embodiments, an external display 34 may be connected to the device 10, such that one or both of the displays 12 and 34 display graphics.

With regard to each of these components, internal display 12 and/or external display 34 may be used to display various images generated by device 10. In one embodiment, display 12 and/or display 34 may be a liquid crystal display (LCD), an organic light emitting diode (OLED) display, or any suitable display. Additionally, in certain embodiments of electronic device 10, display 12 and/or display 34 may be provided in conjunction with a touch-sensitive element, such as a touchscreen, that may be used as part of the user interface for device 10. The external display 34 may include any type of display device capable of connection to the electronic device 10. For example, the external display 34 may be a monitor, a projector, a television, etc.

I/O ports 14 may include ports configured to connect to a variety of external devices, such as a power source, headset or headphones, or other electronic devices (such as handheld devices and/or computers, printers, external displays, modems, docking stations, and so forth). I/O ports 14 may support any interface type, such as a universal serial bus (USB) port, a video port, a serial connection port, an IEEE-1394 port, an Ethernet or modem port, external S-ATA port, and/or an AC/DC power connection port. As noted above, the I/O ports 14 may include video ports (ports used for both audio and video), such as Video Graphics Array (VGA), Digital Visual Interface (DVI), High-Definition Multimedia Interface (HMDI), DisplayPort, Mini DisplayPort, or any suitable video port. In such an embodiment, an external display 34 may be connected to the device 10 through one of the I/O ports 14.

Input devices 16 may include the various devices, circuitry, and pathways by which user input or feedback is provided to processors 18. Such input devices 16 may be configured to control a function of device 10, applications running on device 10, and/or any interfaces or devices connected to or used by electronic device 10. For example, input devices 16 may allow a user to navigate a displayed user interface or application interface. Examples of input devices 16 may include buttons, sliders, switches, control pads, keys, knobs, scroll wheels, keyboards, mice, touchpads, and so forth.

In certain embodiments, input devices 16 and display 12 may be provided together, such as in the case of a touchscreen where a touch sensitive mechanism is provided in conjunction with display 12. In such embodiments, the user may select or interact with displayed interface elements via the touch sensitive mechanism. In this way, the displayed interface may provide interactive functionality, allowing a user to navigate the displayed interface by touching display 12.

User interaction with input devices 16, such as to interact with a user or application interface displayed on display 12, may generate electrical signals indicative of the user input. These input signals may be routed via suitable pathways, such as an input hub or bus, to processor(s) 18 for further processing.

Processor(s) 18 may provide the processing capability to execute the operating system, programs, user and application interfaces, and any other functions of electronic device 10. Processor(s) 18 may include one or more microprocessors, such as one or more "general-purpose" microprocessors, one or more special-purpose microprocessors and/or ASICS, or some combination of such processing components.

The instructions or data to be processed by processor(s) 18 may be stored in a computer-readable medium, such as memory 20. Memory 20 may be provided as a volatile memory, such as random access memory (RAM), and/or as a non-volatile memory, such as read-only memory (ROM). Memory 20 may store a variety of information and may be used for various purposes. For example, memory 20 may store firmware for electronic device 10 (such as a basic input/output instruction or operating system instructions), various programs, applications, or routines executed on electronic device 10, user interface functions, processor functions, and so forth. In addition, memory 20 may be used for buffering or caching during operation of electronic device 10.

The components may further include other forms of computer-readable media, such as non-volatile storage 22, for persistent storage of data and/or instructions. Non-volatile storage 22 may include flash memory, a hard drive, or any other optical, magnetic, and/or solid-state storage media. Non-volatile storage 22 may be used to store firmware, data files, software, wireless connection information, and any other suitable data. In some embodiments, non-volatile storage 22 and/or memory 20 may store code for implementing hot plug functionality to detect when components are connected and disconnected from the electronic device 10, such as through I/O ports 14. Such hot plug functionality may be implemented in firmware and/or the operating system kernel stored on the non-volatile storage 22 and/or memory 20.

The embodiment illustrated in FIG. 1 may also include one or more card or expansion slots. The card slots may be configured to receive expansion card 24 that may be used to add functionality, such as additional memory, I/O functionality, or networking capability, to electronic device 10. Expansion card 24 may connect to the device through any type of suitable connector, and may be accessed internally or external to the housing of electronic device 10. For example, in one embodiment, expansion card 24 may be a flash memory card, such as a SecureDigital (SD) card, mini- or microSD, CompactFlash card, Multimedia card (MMC), or the like.

The components depicted in FIG. 1 also include network device 26, such as a network controller or a network interface card (NIC). In one embodiment, network device 26 may be a wireless NIC providing wireless connectivity over any 802.11 standard or any other suitable wireless networking standard. Network device 26 may allow electronic device 10 to communicate over a network, such as a Local Area Network (LAN), Wide Area Network (WAN), or the Internet. Further, electronic device 10 may connect to and send or receive data with any device on the network, such as portable electronic devices, personal computers, printers, and so forth. Alternatively, in some embodiments, electronic device 10 may not include network device 26. In such an embodiment, a NIC may be added as expansion card 24 to provide similar networking capability, as described above.

Further, the components may also include power source 28. In one embodiment, power source 28 may be one or more batteries, such as a lithium-ion polymer battery or other type of suitable battery. The battery may be user-removable or may be secured within the housing of electronic device 10, and may be rechargeable. Additionally, power source 28 may include AC power, such as provided by an electrical outlet, and electronic device 10 may be connected to power source 28 via a power adapter. This power adapter may also be used to recharge one or more batteries if present.

As mentioned above, electronic device 10 may include graphics processing units 30 (GPU1) and 32 (GPU2). These graphics processors may alternately drive display 12 and/or display 34 by rendering graphics such as a user interface, images, video, or other media to be displayed. One or both of GPUs 30 and 32 may be an integrated GPU (also referred to as on-board GPU) such that GPU 30 and/or 32 are integrated with a chipset of electronic device 10. In other embodiments, one or both of GPUs 30 and 32 may be a dedicated GPU not integrated with a chipset of the electronic device 10 and having dedicated resources such as video memory. In such an embodiment, GPUs 30 and/or 32 may be provided on an expansion card 24.

Each GPU 30 and/or 32 may include 2D and 3D processing capability and may include video memory (such as shared memory or GDDRx memory). Such video memory may be used as frame buffers, texture maps, array storage, or other suitable information. Additionally, each GPU 30 and/or 32 may include any number of rendering pipelines and may be programmable for specific features for 3D processing, e.g., programmable shaders. For example, each GPU 30 and/or 32 may be capable of executing instructions encoded using a 3D programming API, such as Open GL, DirectX, or any other suitable API. Additionally, in some embodiments one or both of the GPUs 30 and/or 32 may include one core, two cores, or any number of cores. In some embodiments, the GPUs 30 and/or 32 may be a GPU manufactured by Nvidia Corporation of Santa Clara, Calif., Advanced Micro Devices, Inc. of Sunnyvale, Calif., and/or Intel Corporation of Santa Clara, Calif. Further, each GPU 30 and 32 may include any number of inputs and outputs and may drive the external display 34 in addition to or instead of display 12.

As described further below, in one embodiment GPU1 30 may have less processing power (e.g., lower clock speed, lower throughput, less pipelines, less video memory, etc.) and may use less power than GPU2 32. In comparison, GPU2 32 may have more processing power (e.g., higher clock speed, higher throughput, more pipelines, more video memory, etc.) and use more power than GPU1 30. In such an embodiment, GPU1 30 may be used to reduce power usage of electronic device 10. In contrast, GPU2 32 may be used for software or displays demanding increased processing power and/or in conditions when power usage is not a concern. In such an embodiment, the GPU2 32 may be referred to as a "high performance" GPU (also referred to as an "HP GPU").

Figure 2:
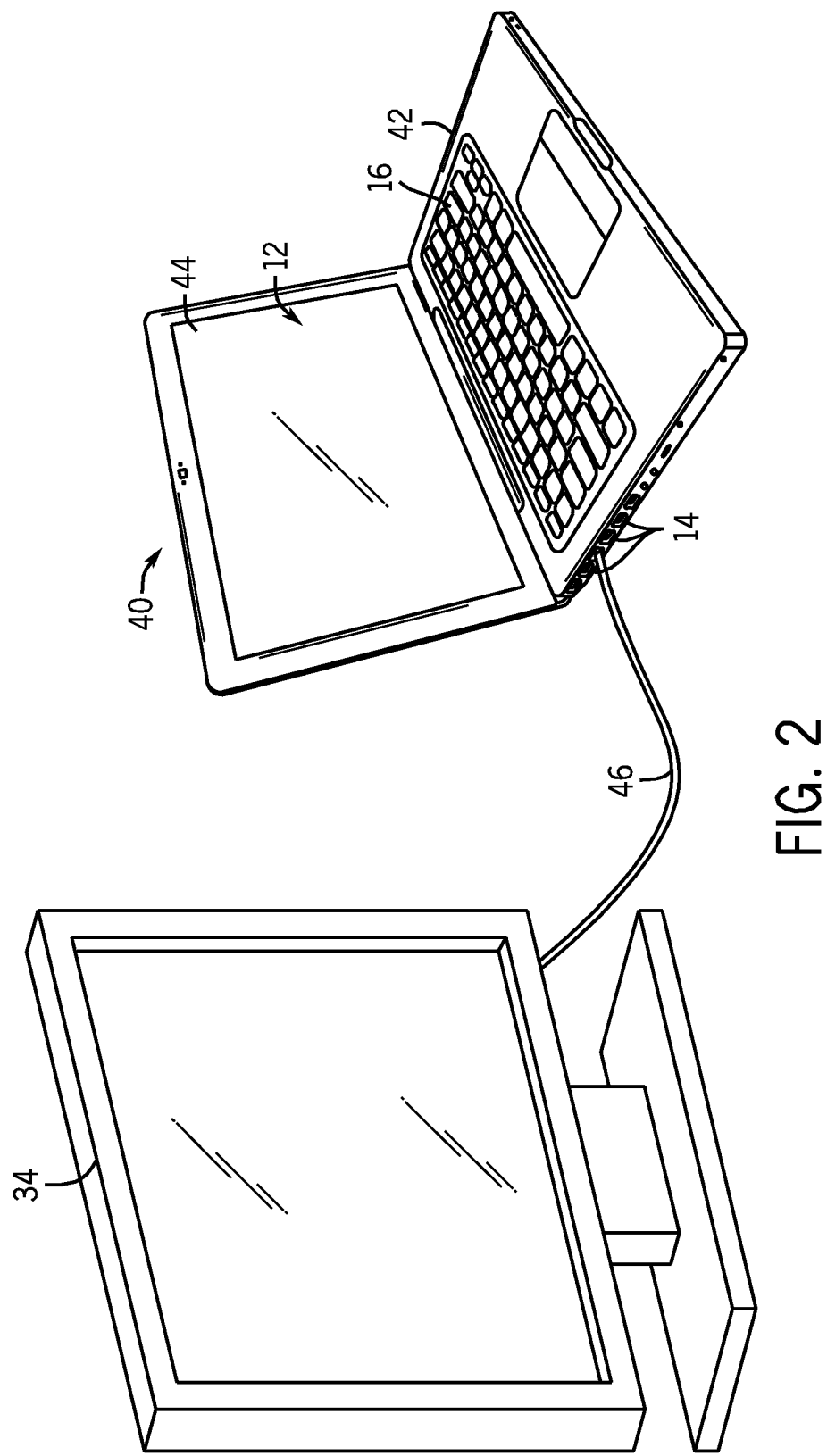
FIG. 2 is a view of a computer coupled to an external display by a passive adapter in accordance with an embodiment of the present invention.
Figure 3:
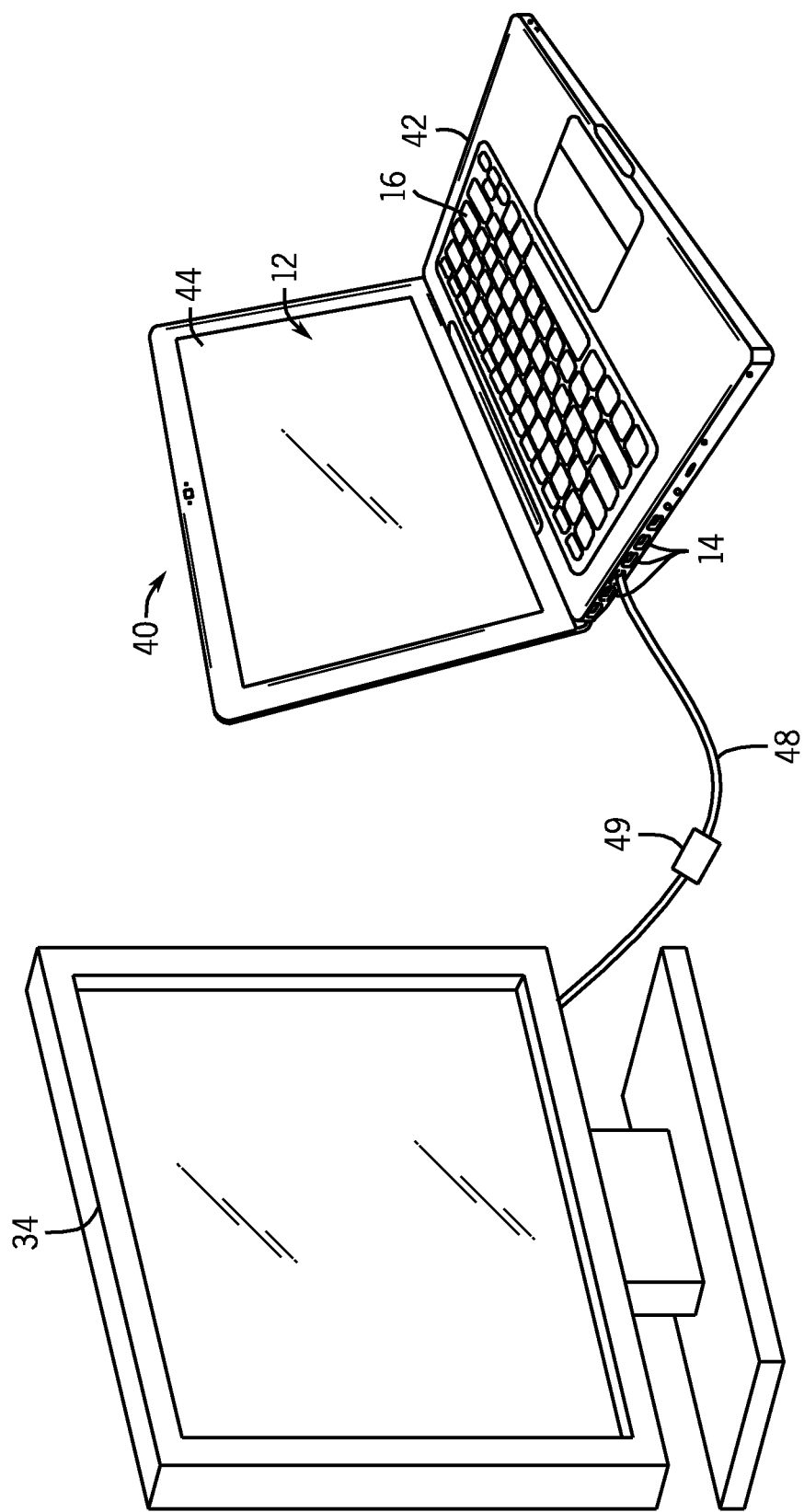
FIG. 3 is a view of a computer coupled to an external display by an active adapter in accordance with an embodiment of the present invention.

Electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, electronic device 10 in the form of a computer may be a model of a MacBook®, MacBook® Pro, MacBook Air®, iMac®, Mac® mini, or Mac Pro® available from Apple Inc, of Cupertino, Calif. By way of example, an electronic device 10 in the form of a laptop computer 40 is illustrated in FIGS. 2 and 3 in accordance with one embodiment of the present invention. The depicted computer 40 includes housing 42, display 12 (such as the depicted LCD 44), input devices 16, and input/output ports 14.

In one embodiment, input devices 16 (such as a keyboard and/or touchpad) may be used to interact with computer 40, such as to start, control, or operate a GUI or applications running on computer 40. For example, a keyboard and/or touchpad may allow a user to navigate a user interface or application interface displayed on LCD 44.

As depicted, electronic device 10 in the form of computer 40 may also include various input and output ports 14 to allow connection of additional devices. For example, computer 40 may include I/O port 14, such as a USB port, video port, or other port, suitable for connecting to another electronic device, a projector, the external display 34 (e.g., an LCD or a projector), and so forth. In addition, computer 40 may include network connectivity, memory, and storage capabilities, as described with respect to FIG. 1. As a result, computer 40 may store and execute a GUI and other applications.

In some embodiments, as shown in FIG. 2, the computer 40 may be coupled to the external display 34 through a passive adapter 46 and one of the input/output ports 14. The passive adapter 46 may be a "pass-through cable" that enables connection of the external monitor 34 to the electronic device 10 through an interface provided by one of the ports 14. Such a passive adapter does not include any additional circuitry (such as processing units) and allows the output signal from the electronic device 10 to "pass through" directly to the external monitor 34 without any additional processing and/or conversion. Thus, in some embodiments the passive adapter 46 may be integral to the external monitor 34, or may be a standalone adapter. In some embodiments, the passive adapter 46 may include other signals such as audio signals, in addition to the video signals.

In other embodiments, as shown in FIG. 3, the computer 40 may be coupled to the external display 34 through an active adapter 48 having circuitry 49 coupled to one of the input/output ports 14. The active adapter 48 may be capable of processing and/or converting the signal output from the electronic device 10 before output to the external monitor 34. In one embodiment, the circuitry 49 of the active adapter 48 may convert the signal from the electronic device 10 from compatibility with a first interface to compatibility with a second interface. For example, the active adapter 48 may convert from a DisplayPort interface on the electronic device 10 to a DVI interface of the external display 34, or vice-versa. In other embodiments, the active adapter 48 may convert between a Mini Display Port interface and a DVI interface, a DVI interface and an HDMI interface, a VGA interface and a DVI interface, a VGA interface and an HDMI interface, or between any suitable interfaces used by the electronic device 10 and the external display 34.

In some embodiments the active adapter 48 may be integral to the external monitor 34, or may be a standalone adapter, such that the active adapter 48 may be separately coupled to the electronic device 10 without connection of any display. In some embodiments, the active adapter 48 may include other signals such as audio signals, in addition to the video signals. The electronic device 10 may include software and/or hardware to determine if the passive adapter 46 or the active adapter 48 is coupled to the electronic device 10. For example, in one embodiment, the circuitry 49 of the active adapter 48 may provide a signal to the electronic device 10 upon connection to identify as an active adapter. In another example, the active adapter 48 may include a different configuration of pins (e.g., more or less pins) than the passive adapter 46 to identify as an active adapter to the electronic device 10.

During operation, the electronic device 10 may be alternately connected to and disconnected from the external display 34 through either the passive adapter 46 or the active adapter 48. For example, the electronic device 10 may be disconnected from the external display 34 to facilitate portable operation of the electronic device 10. The electronic device 10 may be connected to the external monitor 34 when a user desires to use the external display 34 in addition to, or as an alternative to, the internal display 12. In such an embodiment, GPU1 30 may be used to reduce power usage of the electronic device 10 in certain configurations, and GPU2 32 may be used for software and/or hardware (such as the external monitor 34) in which increased processing power is desirable and/or in conditions when power usage is not a concern.

Further, as described above, GPU1 30 and GPU2 32 may have different capabilities, such that GPU1 may have less processing power (e.g., lower clock speed, lower throughput, lower number of shaders, less video memory, etc.) and may use less power than GPU2 32. During the connection and disconnection of the external display 34, it may be desirable to use the GPU2 32 (e.g., a HP GPU) to drive the external display 34 when the external display 34 is connected. However, activation of the appropriate GPU of the electronic device 10 to drive the external display 34 may be complicated by the status of each GPU 30 and 32 and the use of a passive adapter 46 or active adapter 48 to connect the external monitor 34.

FIGS. 4 and 5 depict a block diagram of a GPU power control process in accordance with an embodiment of the present invention. The process depicted in FIGS. 4 and 5 may activate the GPU2 32 or maintain activation of the GPU2 32 upon connection of the external display 34, through either the passive adapter 46 or the active adapter 48. As described further below, this functionality may be implemented through use of hot plug functionality in combination with the passive adapter 46 or the active adapter 48.

FIG. 4 depicts the electronic device 10 having an active GPU (indicated in bold outline) and the external monitor 34 disconnected from the electronic device 10. In FIG. 4, the electronic device 10 may be configured such that GPU1 30 is the "active GPU," e.g., GPU1 30 is providing output (e.g., rendering graphics on) to the internal display 12. GPU2 32 may be "inactive" such that GPU2 32 is not providing any output (e.g., rendering graphics on) to the internal display 12.

As shown in FIG. 5, the external monitor 34 may be connected to the electronic device 10 through an I/O port 14, in the manner described above. The external device 10 may be connected through the passive adapter 46 or an active adapter 48. Upon connection of the external monitor 34, the active GPU may be determined. If the active GPU is the GPU1 30, the GPU power control switches the active GPU to GPU2 32. Thus, as shown in FIG. 5, after connection of the monitor 34, GPU2 32 is providing output (e.g., rendering graphics) to the external monitor 34.

The disconnection of the external monitor 34 may result in GPU switching opposite to that described above. After disconnection of the external monitor 34, the GPU switching process may determine the active GPU and activate the appropriate GPU. As a result, if the GPU switching process determines that the active GPU is the HP GPU, GPU2 32 may be deactivated and GPU1 30 may be activated. Thus, as shown in FIG. 4, GPU1 30 is providing output to the external monitor 34.

In other embodiments, the HP GPU, e.g., GPU2 32, may be already selected as the active GPU before connection of the external monitor 34. FIGS. 6 and 7 depict determination of the active GPU in such a configuration in accordance with an embodiment of the present invention. FIG. 6 depicts the electronic device 10 having an active GPU (indicated in bold outline) and the external monitor 34 disconnected from the electronic device 10. In FIG. 6, the electronic device 10 may be configured such that GPU2 32 is the "active GPU," e.g., GPU2 32 is providing output to the internal display 12. GPU1 31 may be "inactive" such that GPU1 30 is not providing output to the internal display 12.

After connection of the external display 34, the active GPU may be determined. If the active GPU is GPU2 32, the GPU power control may determine that no further activation is needed. Thus, as shown in FIG. 7, after connection of the monitor 34, GPU2 32 remains as the active GPU.

After disconnection of the external monitor 34, the active GPU may again be determined and a suitable GPU may be selected. For example, after disconnection of the external monitor 34, it may be determined that the active GPU is the HP GPU, e.g., GPU2 32, and the suitable GPU is GPU1 30. As a result, GPU2 32 may be deactivated and GPU1 30 may be activated.

As noted above, the adapter used to couple the external monitor 34 to the electronic device 10 may be the passive adapter 46 or the active adapter 48. In such embodiments, the GPU power control may use hot plug functionality and control activation of GPUs in response to connection of the passive adapter 46 or the active adapter 48, and connection of the external monitor 34 thereto.

Figure 8:
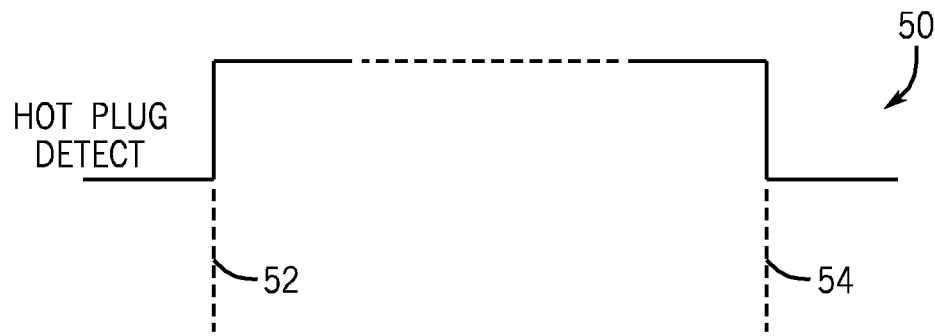
FIG. 8 depicts a hot plug detect signal during connection and disconnection of a passive adapter, in accordance with an embodiment of the present invention.
Figure 9:
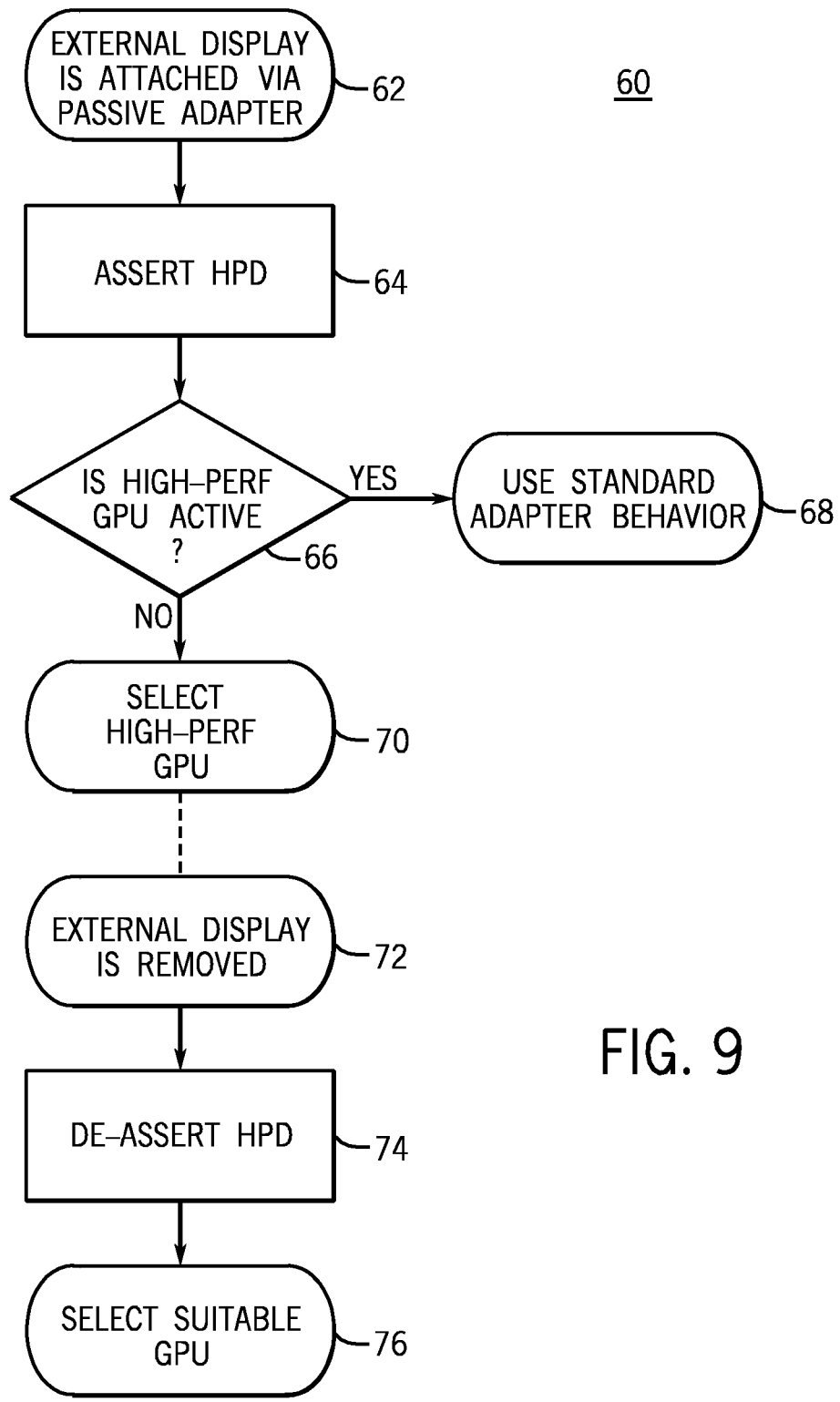
FIG. 9 is a flowchart depicting a process for GPU power control during connection and disconnection of an external display via a passive adapter, in accordance with an embodiment of the present invention.

FIG. 8 depicts a hot plug detect (HPD) signal and FIG. 9 depicts a process for GPU power control during connection and disconnection of an external display via a passive adapter, in accordance with an embodiment of the present invention. With reference to FIG. 8, a hot plug detect signal 50 illustrates connection and disconnection of the external display 34. As illustrated at line 52, after connection of the external display 34 via the passive adapter, the hot plug detect signal 50 is asserted. The hot plug detect signal 50 remains asserted until disconnection of the external display 34 via the passive adapter 46. As illustrated at line 54, after disconnection of the passive adapter 46, the hot plug detect signal 50 is no longer asserted.

As noted above, FIG. 9 depicts a process 60 illustrating the GPU power control during connection and removal of the external display 34 via the passive adapter 46. The process 60 may be implemented in hardware and/or software (such instructions stored on a tangible computer-readable storage medium). Initially, the external display 34 may be connected to the electronic device 10 via the passive adapter 46 (block 62). As shown above in FIG. 8, after connection of the passive adapter 46, the hot plug detection (e.g., HPD signal 50) is asserted (block 64). The process 60 determines if the HP GPU, e.g., GPU2 32, is active (block 66). If the HP GPU is active, then no switching is performed and the standard adapter behavior of the passive adapter 46 is used (block 68). If the HP GPU is inactive, then the HP GPU may be activated in response to the assertion of the HPD signal 50 (block 70). Any other GPU in the electronic device 10, e.g., GPU1 30, may remain active (to drive the internal display 12) or may be deactivated (such that the HP GPU drives both the internal display 12 and the external display 34 or only the external display 34).

During the process 60, the external display 34 and passive adapter 46 may be disconnected from the electronic device 10 (block 72). As shown above in FIG. 8, after disconnection of the passive adapter 46 the HPD signal 50 is deasserted (block 74). After disconnection of the external display 34, the process 60 may select a suitable GPU (block 76) to drive the internal display 12. For example, this GPU selection may be based on the power configuration and settings of the electronic device 10, direct selection by a user of the electronic device 10, and/or the applications running on the electronic device 10.

In other embodiments, the adapter coupling the external monitor 34 to the electronic device 10 may be the active adapter 48. As noted above, the active adapter 48 may convert one type of interface of the electronic device 10 to another type of interface to enable connection of the external monitor 34. However, the active adapter 48 may be connected without connection of the external display 34. In such an embodiment, the GPU power control process may ensure that the GPU switch may not occur until after the external display 34 is connected to the active adapter 48.

Figure 10:
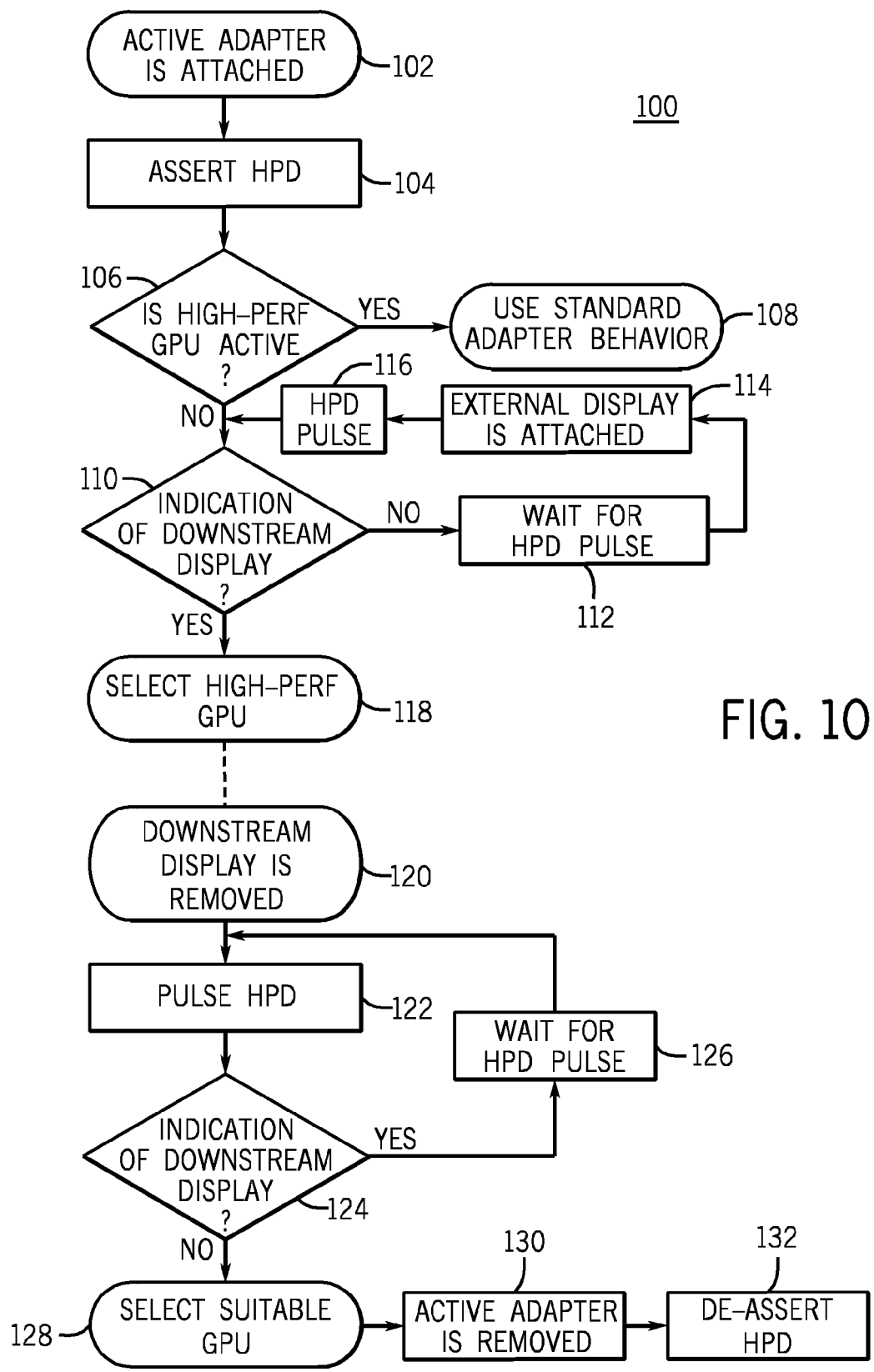
FIG. 10 is a flowchart depicting a process for GPU power control during connection and disconnection of an external display via an active adapter, in accordance with an embodiment of the present invention.

FIG. 10 depicts a process 100 for GPU power control during connection and disconnection of the external display 34 via the active adapter 48, in accordance with an embodiment of the present invention. The process 100 may be implemented in hardware and/or software (such instructions stored on a tangible computer-readable storage medium). Initially, the active adapter 48 may be connected to the electronic device 10 (block 102). After connection of the active adapter 48, hot plug detection is asserted (block 104). The process 100 determines if the HP GPU, e.g., GPU2 32, is active (decision block 106). If the HP GPU is currently the active GPU, then the standard adapter behavior is used (block 108) and no switching is performed.

The GPU power control may detect or receive an indicator of the connection (or disconnection) of the external display 34 to verify that the external display 34 is connected (block 110). The indicator of the connection of the external display 34 may be any indicator that enables the GPU power control to determine if the external display 34 is coupled to the electronic device 10. For example, the indicator may be a change in a register of the electronic device 10, a signal received from the external monitor 34, a signal received from the circuitry 49 of the active adapter 48, or other suitable indications. If the indicator does not indicate a connected external display 34, the GPU power control waits (block 112) until an HPD pulse is caused and the indicator changes. As described above, an external monitor 34 may be connected to the electronic device 10 (block 114), and the connection of the external monitor 34 may cause a hot plug event (e.g., HPD pulse 116). Once the indicator indicates a connected external display (block 110), the HP GPU may be selected and activated (block 118) to provide output to the external display 34. As noted above, any other GPU in the electronic device 10 may remain active (to drive the internal display 12) or may be deactivated (such that the HP GPU drives both the internal display 12 and the external display 34 or only the external display 34).

During operation of the electronic device 10, the external display 34 may be removed from the active adapter 48 (block 120), causing a hot plug event (e.g., an HPD pulse 122). The indicator may be detected or received to determine if an external display 34 is connected (decision block 124). If the indicator does not indicate a disconnected external display 34, the GPU power control waits (block 126) until an HPD pulse is caused and the indicator no longer indicates connection of the external display 34. After disconnection of the external display 34, a suitable GPU may be selected and, if necessary, activated (block 128). For example, this GPU selection may be based on the power configuration and settings of the electronic device 10, direct selection by a user of the electronic device 10, and/or the applications running on the electronic device 10. During further operation of the electronic device 10, the active adapter may be removed (block 130). After removal of the active adapter, hot plug detection may be deasserted (block 132).

Figure 11:
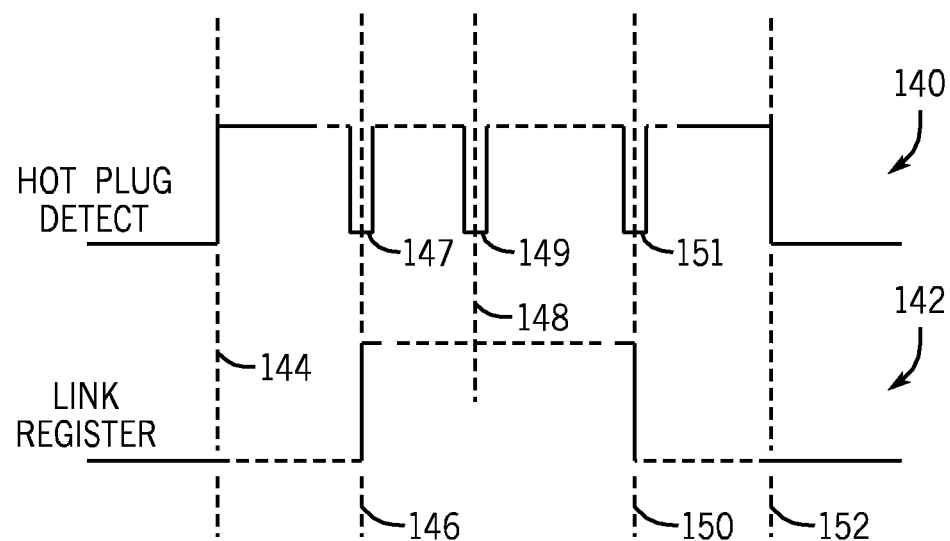
FIG. 11 depicts a hot plug detect signal and a link register during connection and disconnection of an active adapter and an external display, in accordance with an embodiment of the present invention.
Figure 12:
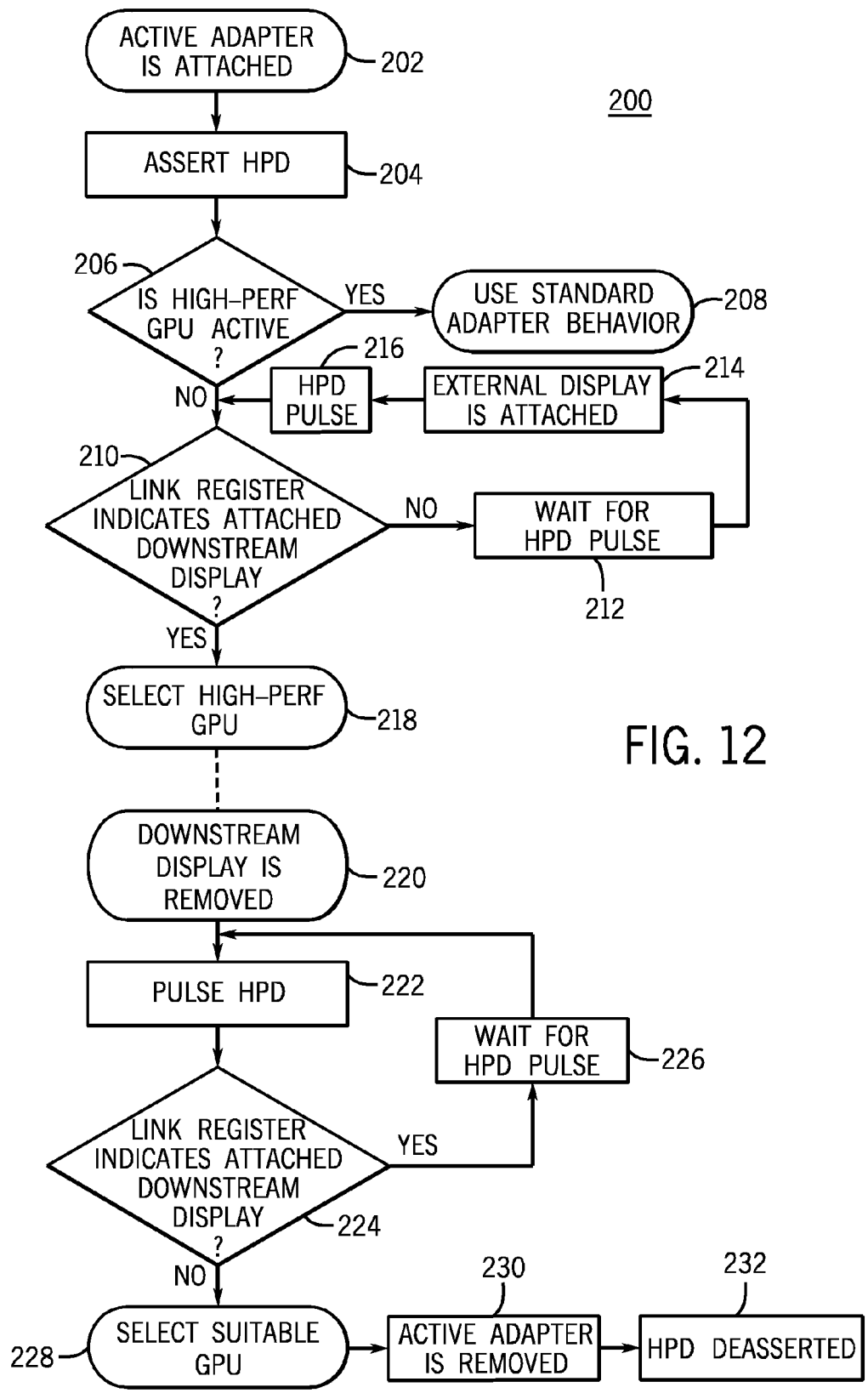
FIG. 12 is a flowchart depicting a process for GPU power control during connection and disconnection of an external display via an active adapter, in accordance with an embodiment of the present invention.

In some embodiments, the indication of connection of the external display may be a change in the state of a link register that coincides with an HPD pulse. FIG. 11 depicts an HPD signal and the state of a link register, and FIG. 12 depicts a process for GPU power control during connection and disconnection of an external display via an active adapter, in accordance with an embodiment of the present invention. With reference to FIG. 11, HPD signal 140 and a link register state 142 are illustrated during connection and disconnection of the external display 34 to the electronic device 10 via the active adapter 48. As illustrated at line 144, after connection of the active adapter 48, the hot plug detect signal 140 is asserted, and the state of the link register 142 has not changed. Connection of the external display 34 and other events, such as connection or disconnection of other devices to and from the electronic device 10, may cause HPD pulses in the HPD signal 140. As shown at line 146, connection of the external display 34 to the electronic device 10 causes an HPD pulse 147 when the external display 34 is connected through the active adapter 48. As shown at line 148, another HPD pulse 149 may occur when another event (e.g., connection or disconnection of another device to or from the electronic device 10) occurs. As shown at line 150, another HPD pulse 151 may occur when the external display 34 is removed from the active adapter 48. Finally, the HPD signal 140 remains asserted until disconnection of the active adapter 48, as illustrated at line 152.

As shown in FIG. 11, a register (e.g., a link register) may be examined, in coincidence with HPD pulses, to determine the state of the external display 34, i.e., to determine if the events causing HPD pulses in the HPD signal 140 are a result of connection and/or disconnection of the external display 34 or other events (such as those shown by HPD pulse 149). The link register 142 may indicate any type of information about a device to indicate that the external display 34 is connected and/or disconnected. For example, the link register 142 may indicate the presence of a framebuffer in a device, a specific processor or type of processor in a device, or any other suitable indicator that may be related to the external display 34.

As shown in FIG. 11, the state of the link register changes as the external display 34 is connected or disconnected. For example, at line 144 when the active adapter 48 is attached to the electronic device 34, the link register is unchanged, indicating that no external display 34 is connected through the active adapter 48. After the external display 34 is coupled to the active adapter 48, as indicated at line 146, the state of the link register 142 changes and the link register may be read to indicate connection of the external display 34. When the external display 34 is disconnected, as illustrated at line 150, the state of link register 142 changes again, and the link register may be read to indicate the external display 34 is no longer connected.

As noted above, FIG. 12 depicts a process 200 depicting another embodiment of the GPU power control during connection and disconnection of the external display via the active adapter 48, in which a link register is used to indicate the connection of the external display 34. The process 200 may be implemented in hardware and/or software (such instructions stored on a tangible computer-readable storage medium). Initially, the active adapter 48 may be connected to the electronic device 10 (block 202). As shown in FIG. 11, after connection of the active adapter 48, hot plug detection (e.g., HPD signal 140) is asserted (block 204). The process 200 determines if the HP GPU, e.g., GPU2 32, is active (decision block 206). If the HP GPU is the active GPU, then the standard adapter behavior is used (block 208), and no switching is performed.

The GPU power control may read the link register to indicate the connection of the external display 34 to the active adapter 48 (decision block 210). If the link register does not indicate a connected external display 34, the GPU power control waits (block 212) until an HPD pulse is caused and the state of the link register changes. As described above, an external display 34 may be connected to the electronic device 10 (block 214), and the connection of the external display 34 may cause a hot plug event (e.g., HPD pulse 216). The link register may be read to determine if the link register indicates a connected external display 34 (decision block 210). Once the link register indicates a connected external display, the HP GPU may be activated (block 218) to provide output to the external display 34. As noted above, any other GPU in the electronic device 10 may remain active (to drive the internal display 12) or may be deactivated (such that the HP GPU drives both the internal display 12 and the external display 34 or only the external display 34).

During operation of the electronic device 10, the external display 34 may be disconnected from the active adapter 48 (block 220). As described above in FIG. 11, disconnection of the external display 34 may cause an HPD pulse (block 222). The link register may be read to determine if the state of the link register indicates a connected external display 34 (decision block 224). If the link register indicates a connected external display 34, the GPU power control waits (block 226) until an HPD pulse is caused and the state of the link register changes. After disconnection of the external display 34, a suitable GPU may be selected and, if necessary, activated (block 228). For example, this GPU selection may be based on the power configuration and settings of the electronic device 10, direct selection by a user of the electronic device 10, and/or the applications running on the electronic device 10. During further operation of the electronic device 10, the active adapter may be removed (block 230). As shown in FIG. 11, after removal of the active adapter, the HPD signal may be deasserted (block 232).

In other embodiments, the power control process described above may extend to other devices, such as audio devices or mixed video/audio devices. For example, instead of external display 34, the electronic device 10 may be coupled to an audio receiver, amplifier, or other audio device. The power control process may then be used to switch between audio processing units (e.g., soundcards) of the electronic device 10, depending on connectivity of the audio device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method, comprising:
   detecting connection of an adapter;
   asserting hot plug detection upon connection of the adapter when an external device is connected to the adapter and when the external device is not connected to the adapter;
   detecting connection of an external display as the external device, wherein the external display is connected to the electronic device through the adapter;
   determining if a first graphics processing unit (GPU) of at least two GPUs of an electronic device is active upon connection of the external display to the electronic device; and
   activating the first GPU to provide output to the external display and an internal display if the first GPU is not active upon connection of the external display to the electronic device.

2. The method of claim 1, comprising receiving a hot plug detect (HPD) pulse based on connection of the external display.

3. The method of claim 1, wherein detecting connection of an external display to the electronic device comprises reading a register to receive an indication of the connection of the external display.

4. The method of claim 1, comprising detecting disconnection of the external display from the electronic device through the adapter.

5. The method of claim 4, comprising deasserting hot plug detection after disconnection of the adapter.

6. The method of claim 4, comprising selecting a second GPU of the at least two GPUs to provide output to the internal display and deactivating the first GPU after disconnection of the external display.

7. The method of claim 4, comprising receiving a hot plug detect pulse based on disconnection of the external display.

8. The method of claim 4, wherein detecting disconnection of the external display from the electronic device comprises reading a register to receive an indication of the disconnection of the external display.

9. The method of claim 1, wherein the adapter comprises an active adapter.

10. The method of claim 1, wherein the first GPU has greater graphics processing power than a second GPU of the electronic device.

11. A system, comprising:
    an electronic device comprising:
       a processor;
       a first graphic processing unit (GPU);
       a second GPU; and
       a memory storing instructions to be executed by the processor for:
          asserting hot plug detect upon connection of an adapter when an external device is connected to the adapter and when the external device is not connected to the adapter;
          detecting a hot plug detect (HPD) pulse based on connection of an external display as the external device;
          determining if the first GPU is active upon connection of the external display; and
          activating the first GPU to provide output to the external display and an internal display if the first GPU is not active upon connection of the external display.

12. The system of claim 11, wherein the second GPU is configured to provide output to the internal display when the first GPU is not active.

13. The system of claim 12, wherein the memory comprises instructions to be executed by the processor for activating the first GPU to provide output to the external display and using the second GPU to provide output to the internal display.

14. The system of claim 11, wherein the memory stores instructions to be executed by the processor for:
    detecting a hot plug detect (HPD) pulse based on connection of an external audio device;
    determining if the first GPU is active upon connection of the external audio device; and activating the first GPU to provide output to the external audio device if the first GPU is not active upon connection of the external audio device.

15. A method, comprising:
detecting connection of an adapter to an electronic device, wherein the adapter converts a first interface to a second interface;
asserting hot plug detection upon connection of the when an external device is connected to the adapter and when the external device is not connected to the adapter;
reading an indication of connection of an external display as the external device to the adapter via the second interface; and
activating a first GPU of at least two GPUs of the electronic device based on the indication.

16. The method of claim 15, wherein reading an indication of connection of an external device comprises reading a register after detecting a hot plug detect pulse.

17. The method of claim 15, comprising reading an indication of disconnection of the external display from the adapter via the second interface.

18. The method of claim 15, comprising detecting disconnection of the adaptor from the electronic device.

19. The method of claim 15, wherein asserting the hot plug detection occurs prior to the connection of the external display to the adapter.

20. The method of claim 15, wherein asserting the hot plug detection occurs after the connection of the external display to the adapter.

21. Tangible computer-readable storage media comprising instructions for:
asserting hot plug detection after connection of an adapter to an electronic device when an external device is connected to the adapter and when the external device is not connected to the adapter, wherein the adapter converts a first interface to a second interface;
reading an indication of connection of an external display as the external device to the adapter via the second interface; and
activating a first GPU of at least two GPUs of the electronic device based on the indication, such that the first GPU provides output to the external display.

22. The method of claim 21, wherein asserting hot plug detection after connection of the adapter to the electronic device comprises asserting hot plug detection without connection of the external device.

23. A method, comprising:
detecting connection of an adapter to an electronic device, wherein the adapter converts a first interface to a second interface;
asserting a hot plug detect (HPD) signal in response to the connection, when an external device is connected to the adapter and when the external device is not connected to the adapter;
detecting an HPD pulse in the HPD signal; and
switching from a first GPU to a second GPU based on the detection, such that the second GPU provides output to the external display.

24. The method of claim 23, wherein detecting the HPD pulse in the HPD signal comprises determining whether the HPD pulse is a result of a connection or disconnection of an external display as the external device or a result of a connection or disconnection of a second electronic device to or from the electronic device, or some combination thereof.

* * * * *